(12) United States Patent
Fetzer et al.

(10) Patent No.: US 9,075,614 B2
(45) Date of Patent: *Jul. 7, 2015

(54) MANAGING POWER CONSUMPTION IN A MULTI-CORE PROCESSOR

(71) Applicant: Intel Corporation, Santa Clara, CA (US)

(72) Inventors: Eric Fetzer, Loveland, CO (US); Reid Riedlinger, Wellington, CO (US); Don Soltis, Windsor, CO (US); William Bowhill, Framingham, MA (US); Satish Shrimali, Bangalore (IN); Krishnakanth Sistla, Beaverton, OR (US); Efraim Rotem, Haifa (IL); Rakesh Kumar, Bangalore (IN); Vivek Garg, Folsom, CA (US); Alon Naveh, Ramat Hasharon (IL); Lokesh Sharma, Bangalore (IL)

(73) Assignee: Intel Corporation, Santa Clara, CA (US)

( * ) Notice: Subject to any disclaimer, the term of this patent is extended or adjusted under 35 U.S.C. 154(b) by 171 days.

This patent is subject to a terminal disclaimer.

(21) Appl. No.: 13/782,492

(22) Filed: Mar. 1, 2013

(65) Prior Publication Data

US 2013/0232368 A1 Sep. 5, 2013

Related U.S. Application Data

(63) Continuation of application No. 13/422,476, filed on Mar. 16, 2012.

(30) Foreign Application Priority Data

Mar. 21, 2011 (IN) .............................. 773/DEL/2011

(51) Int. Cl.
*G06F 1/26* (2006.01)
*G06F 1/32* (2006.01)

(52) U.S. Cl.
CPC .............. *G06F 1/3296* (2013.01); *G06F 1/324* (2013.01); *Y02B 60/1217* (2013.01); *Y02B 60/1285* (2013.01)

(58) Field of Classification Search
USPC ......... 713/300, 310, 320, 321, 322, 323, 324, 713/330, 340
See application file for complete search history.

(56) References Cited

U.S. PATENT DOCUMENTS 5,163,153 A 11/1992 Cole et al.
5,522,087 A 5/1996 Hsiang
(Continued)

FOREIGN PATENT DOCUMENTS

EP 1 282 030 A1 5/2003
JP 2002033457 A 1/2002
(Continued)

OTHER PUBLICATIONS

German Patent Office, Office Action Mailed Sep. 8, 2014, in German Application No. 112012001358.1.
(Continued)

*Primary Examiner* — Kim Huynh
*Assistant Examiner* — Paul J Yen
(74) *Attorney, Agent, or Firm* — Trop, Pruner & Hu, P.C.

(57) ABSTRACT

A processor may include a core and an uncore area. The power consumed by the core area may be controlled by controlling the Cdyn of the processor such that the Cdyn is within an allowable Cdyn value irrespective of the application being processed by the core area. The power management technique includes measuring digital activity factor (DAF), monitoring architectural and data activity levels, and controlling power consumption by throttling the instructions based on the activity levels. As a result of throttling the instructions, throttling may be implemented in $3^{rd}$ droop and thermal design point (TDP). Also, the idle power consumed by the uncore area while the core area is in deep power saving states may be reduced by varying the reference voltage VR and the VP provided to the uncore area. As a result, the idle power consumed by the uncore area may be reduced.

11 Claims, 8 Drawing Sheets

(56) References Cited

U.S. PATENT DOCUMENTS

| | | |
|---|---|---|
| 5,590,341 A | 12/1996 | Matter |
| 5,621,250 A | 4/1997 | Kim |
| 5,931,950 A | 8/1999 | Hsu |
| 6,564,328 B1* | 5/2003 | Grochowski et al. ......... 713/320 |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,281,140 B2 | 10/2007 | Burns et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,730,340 B2 | 6/2010 | Hu et al. |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0230851 A1* | 11/2004 | Chao et al. ..................... 713/320 |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0156992 A1 | 7/2007 | Jahagirdar |
| 2007/0214342 A1 | 9/2007 | Newburn |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0244294 A1* | 10/2008 | Allarey .......................... 713/324 |
| 2008/0250260 A1 | 10/2008 | Tomita |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0210590 A1 | 8/2009 | Circello |
| 2009/0235105 A1 | 9/2009 | Branover et al. |
| 2010/0077232 A1 | 3/2010 | Jahagirdar et al. |
| 2010/0083009 A1 | 4/2010 | Rotem et al. |
| 2010/0115304 A1 | 5/2010 | Finkelstein et al. |
| 2010/0115309 A1 | 5/2010 | Carvalho et al. |
| 2010/0146513 A1 | 6/2010 | Song |
| 2010/0191993 A1* | 7/2010 | Chaudhry et al. ............ 713/322 |
| 2010/0191997 A1 | 7/2010 | Dodeja et al. |
| 2011/0022865 A1 | 1/2011 | Gunther et al. |
| 2011/0154090 A1 | 6/2011 | Dixon et al. |
| 2012/0079290 A1 | 3/2012 | Kumar |
| 2012/0246506 A1 | 9/2012 | Knight |

FOREIGN PATENT DOCUMENTS

| | | |
|---|---|---|
| JP | 2008102927 A | 5/2008 |
| JP | 2009530759 A | 8/2009 |
| KR | 20020062986 | 7/2002 |
| KR | 20090116812 | 11/2009 |

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

SPEC-Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

International Application No. PCT/US2012/028865, filed Mar. 13, 2012, entitled "Providing Efficient Turbo Operation of a Processor," by Intel Corporation.

International Application No. PCT/US2012/028902, filed Mar. 13, 2012, entitled "Dynamically Controlling Interconnect Frequency in a Processor," by Intel Corporation.

International Application No. PCT/US2012/028876, filed Mar. 13, 2012, entitled "Dynamically Computing an Electrical Design Point (EDP) for a Multicore Processor," by Intel Corporation.

U.S. Appl. No. 13/247,564, Filed Sep. 28, 2011, entitled, "Estimating Temperature of a Processor Core in a Low Power State", by Avinash N. Ananthakrishnan, et al.

U.S. Appl. No. 13/282,896, Filed Oct. 27, 2011, entitled, "Enabling a Non-Core Domain to Control Memory Bandwidth", by Avinash N. Ananthakrishnan, et al.

U.S. Appl. No. 13/282,947, Filed Oct. 27, 2011, entitled, "Controlling Operating Frequency of a Core Domain Via a Non-Core Domain of a Multi-Domain Processor", by Avinash N. Ananthakrishnan, et al.

U.S. Appl. No. 13/285,414, Filed Oct. 31, 2011, entitled, "Controlling a Turbo Mode Frequency of a Processor," by Avinash N. Ananthakrishnan, et al.

U.S. Appl. No. 13/247,580, Filed Sep. 28, 2011, entitled, "Controlling Temperature of Multiple Domains of a Multi-Domain Processor," by Avinash N. Ananthakrishnan, et al.

U.S. Appl. No. 13/285,465, Filed Oct. 31, 2011, entitled, "Dynamically Controlling Cache Size to Maximize Energy Efficiency," by Avinash N. Ananthakrishnan, et al.

U.S. Appl. No. 13/225,677, Filed Sep. 6, 2011, entitled, "Dynamically Allocating a Power Budget Over Multiple Domains of a Processor," by Avinash N. Ananthakrishnan, et al.

(56) References Cited

OTHER PUBLICATIONS

U.S. Appl. No. 13/600,568, Filed Aug. 31, 2012, entitled, "Configuring Power Management Functionality in a Processor," by Malini K. Bhandaru, et al.

International Searching Authority, "Notification of Transmittal of the International Search Report and the Written Opinion of the International Searching Authority," mailed Oct. 31, 2012, in International application No. PCT/US2012/029604.

Japanese Patent Office, Office Action Mailed Aug. 19, 2014, in Japanese Application No. 2014-501164.

Korean Patent Office, Korean Office Action Mailed Oct. 30, 2014, in Korean Application No. 2013-7024802 (Redacted).

* cited by examiner

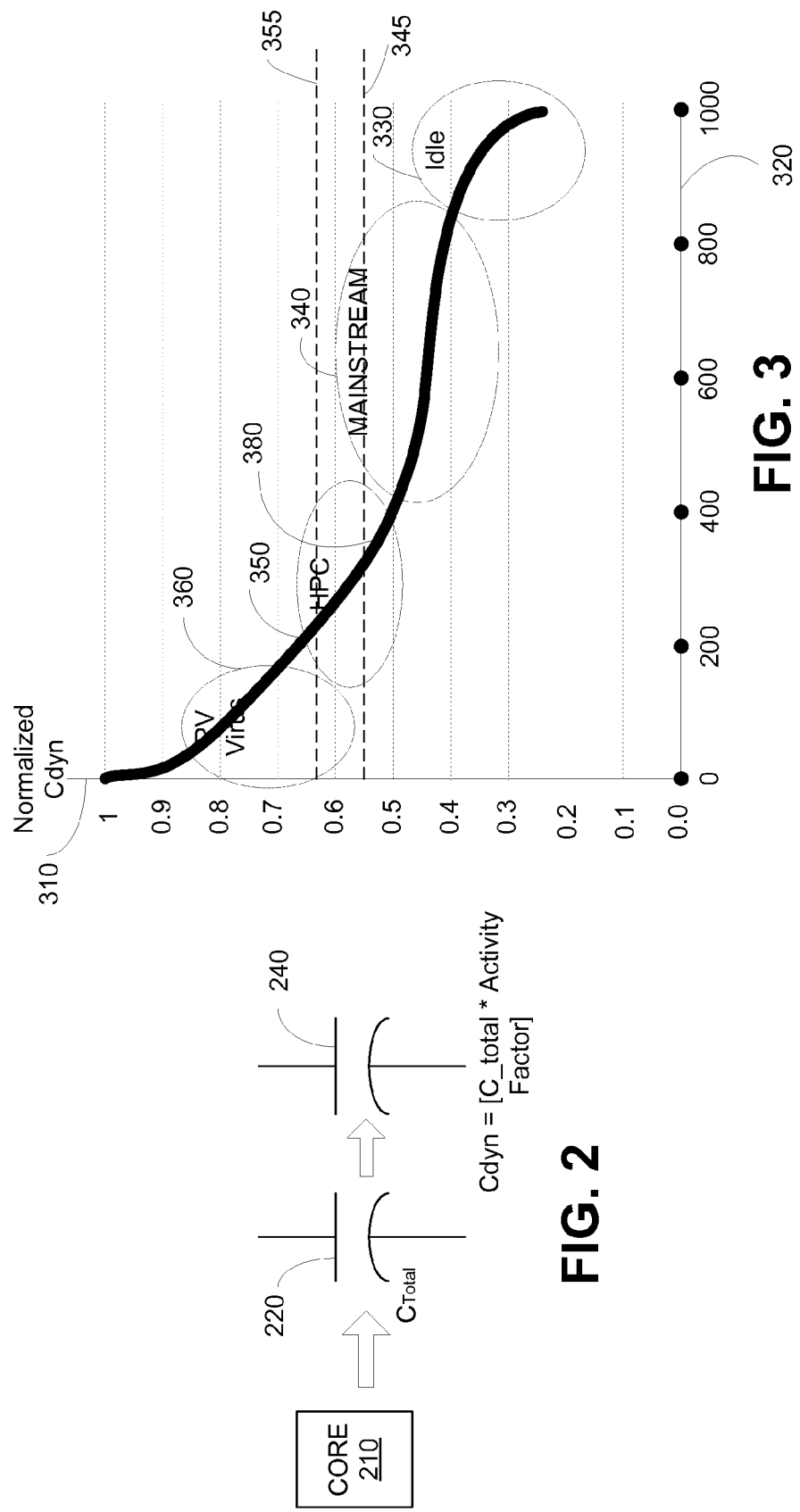

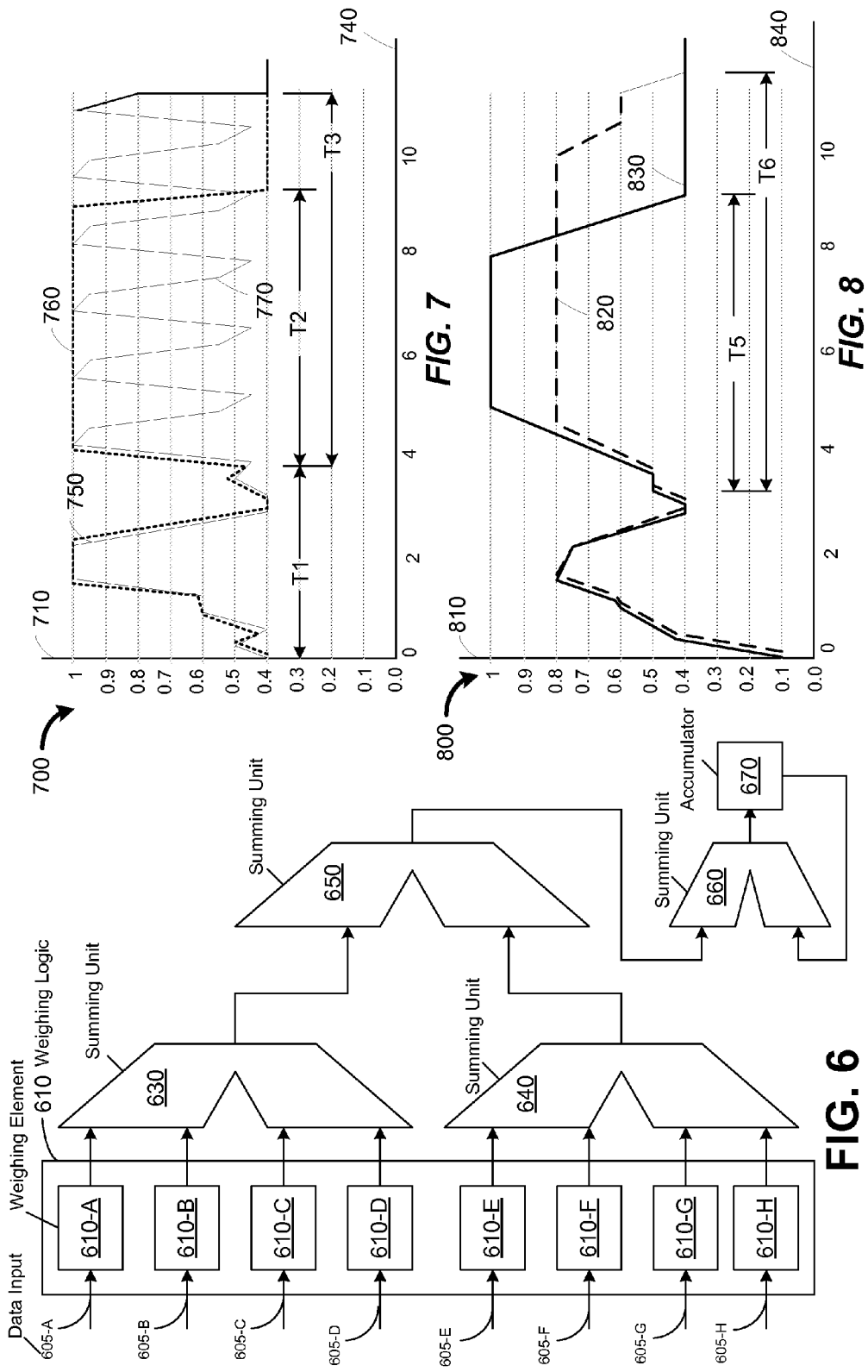

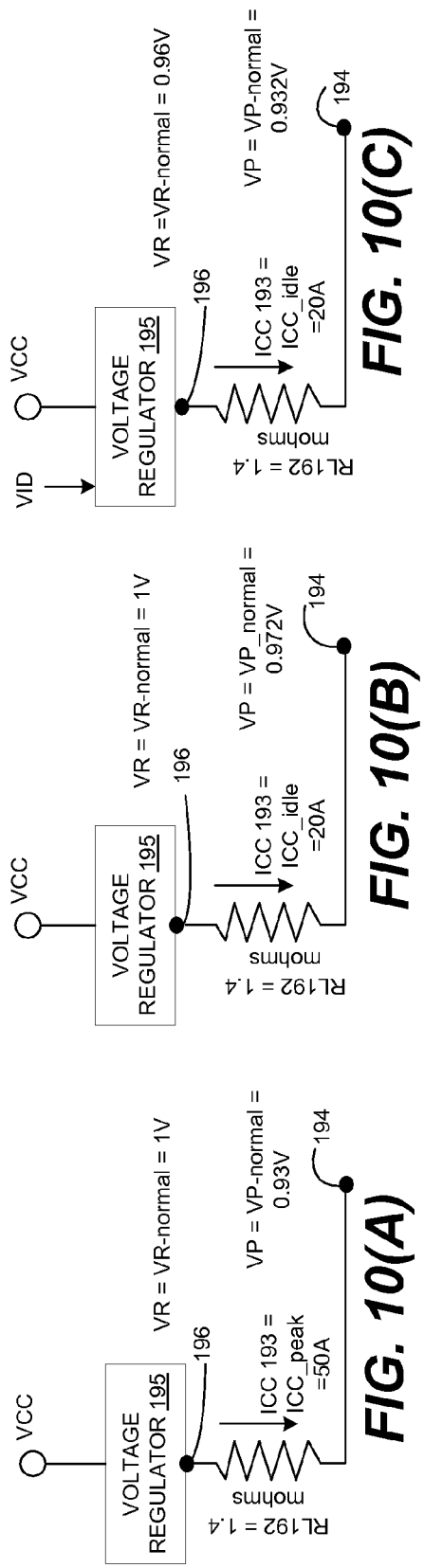

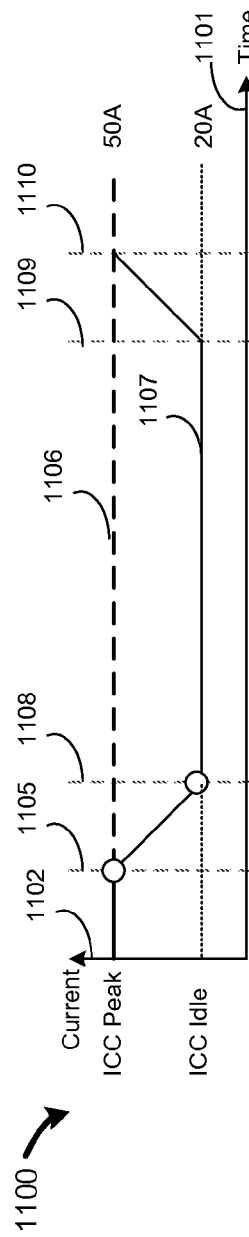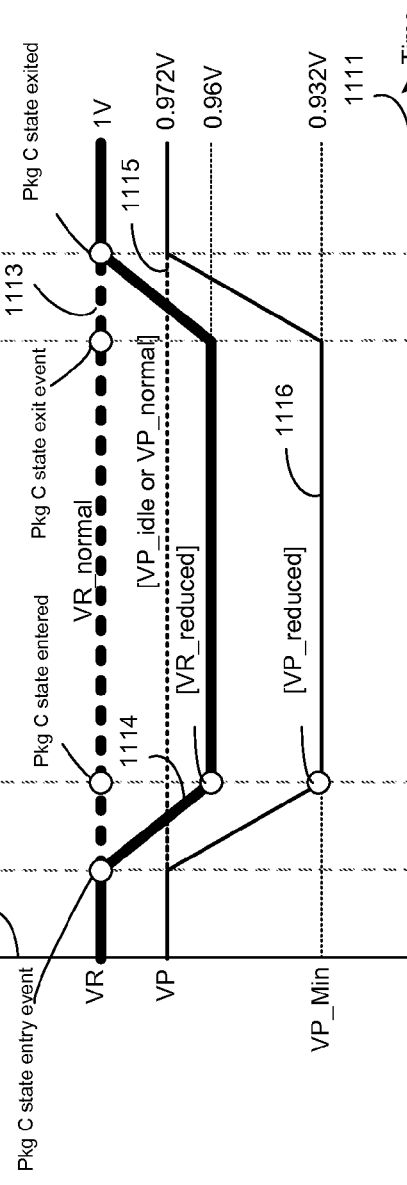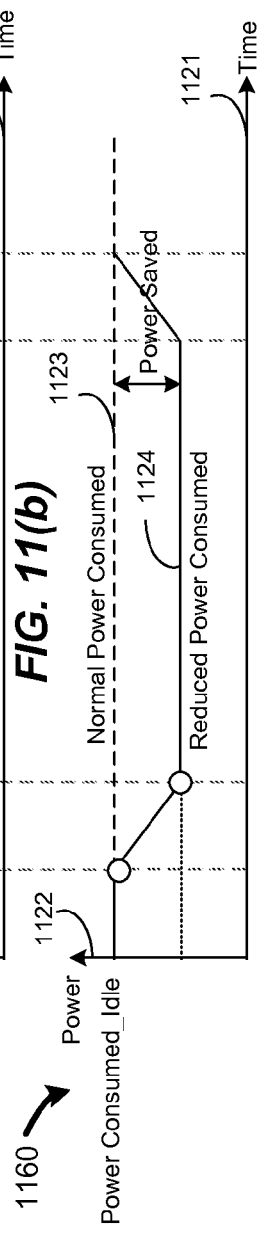

MANAGING POWER CONSUMPTION IN A MULTI-CORE PROCESSOR

This application is a continuation of U.S. patent application Ser. No. 13/422,476, filed Mar. 16, 2012, which claims priority to Indian Application No. 773/DEL/2011, filed Mar. 21, 2011 in the Indian Patent Office, the content of which is hereby incorporated by reference.

BACKGROUND

A computer system may comprise a processor, which may include a core area and an uncore area. The core area may include one or more processing cores, caches (L1 and L2, for example), line-fill buffers and the uncore area may comprise last level caches, a memory controller, and such other blocks. The processor power management techniques aim at reducing the power consumed by the core area. In one prior approach, an activity factor in the core area is measured and a power value (actual power consumption value) corresponding to the activity factor is determined. Then, voltage and/or frequency operating point may be varied based on a comparison between the actual power consumption value and an allowable power value. The power management technique may lower the voltage and/or frequency operating point after detecting that the actual power consumption value is equal to or higher than the allowable power value. However, a specific amount of time would be incurred between the point at which the high activity is detected and the point at which the voltage and/or frequency operating point is actually lowered. In between these two points, the computer system may operate in high power state and high activity state as well. To avoid such a situation, the processor (or the part) has to be binned at a lower voltage and frequency point (V/F) point.

In another prior approach, the voltage and/or frequency operating points may be selected based on the processor power saving (P) states and boost modes, which may modulate the voltage and/or frequency operating points based on the actual power consumed value. The above approaches rely on voltage operation range to increase or decrease the power and performance through frequency. With each new generation of processors, the voltage range is reduced as VCCmax is lowered for gate-oxide reliability while VCCmin remains almost constant. The above approaches are reactive in nature to the over power condition. The power management techniques discussed above respond only after the processor has reached a high thermal or power state. As a result, the time taken (or latency) to actually change the voltage and/or frequency operating point in response to a change in the thermal or power state is substantial and there is a need to reduce the latency.

Also, on the other hand, the modern processors are targeted for many core designs and these cores are coupled to a common uncore area. With the advancements in the process technology, the uncore area within the processor is growing larger in size. The uncore areas in modern processors may include many functional and logical blocks (e.g., memory controller, last level caches, home agents, routing agents, caching agents, power control units, interfaces, and such other blocks) and may typically operate on a different power plane than that of the core area. Desirably, these processors need to consume low idle power, for example, to reduce the total energy consumed and/or improving the battery life. However, the power consumed by such larger uncore area has reached considerable levels (close to 50% of the total power consumed by the processor).

Management of power consumption in the uncore area has become more important than ever. The power management in the uncore area poses additional challenges as there are no well defined sleep states (for example, C0 to C6/C7) like that of the core area. Especially, when the core area is in deep sleep state such as a C3, C6/C7 or any other similar states (referred to as package C-state), the core architecture states are saved in the uncore area and the core voltage is reduced to a substantially minimum value using per core power gate transistors (PGT) or embedded power gates (EPG). Under this condition, the idle power consumption by the core area is almost zero and the idle power consumed by the uncore area is substantial. Also, the uncore area, unlike the core area, has to be active to service any external requests within a specified latency. Many of these processors are designed for multi-socket configuration with distributed memory coupled to the multiple sockets. Using power optimization techniques such as voltage and frequency scaling may affect the snoops or memory access response to the peer sockets or system agent response latency. Thus, the current processors do not use voltage/frequency scaling techniques to conserve power in the uncore area while the core area in package C-state. As a result, the processor package idle power is as high as 20-40% of the thermal design power (TDP) power. Thus, there is a need for improved power management techniques in both the core and the uncore areas of the processor.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 2 illustrates the core area of the processor modeled in terms of total capacitance (Ctotal) and dynamic capacitance (Cdyn) in accordance with one embodiment.

FIG. 3 illustrates a plot of variation of Cdyn with reference to change in the workload of the applications in accordance with one embodiment.

FIG. 6 illustrates a block diagram of an activity accumulation logic used to implement the activity based power saving technique used in the core area in accordance with one embodiment.

FIG. 7 is a graph, which illustrates an effect of the activity based power saving technique on the instantaneous activity in the core area in accordance with one embodiment.

FIG. 8 is a graph, which illustrates an effect of the activity based power saving technique on the average activity in the core area in accordance with one embodiment.

FIGS. 10(A), 10(B), and 10(C) illustrate a reduction in the voltage provided to the uncore area while using a load-line IR drop based power saving technique in accordance with one embodiment.

FIGS. 11(A), 11(B), and 11(C) are timing diagrams, which illustrate the variation of current, voltage, and power in response to using the load-line IR drop based power saving technique in the uncore area in accordance with one embodiment.

DETAILED DESCRIPTION

Figure 1:
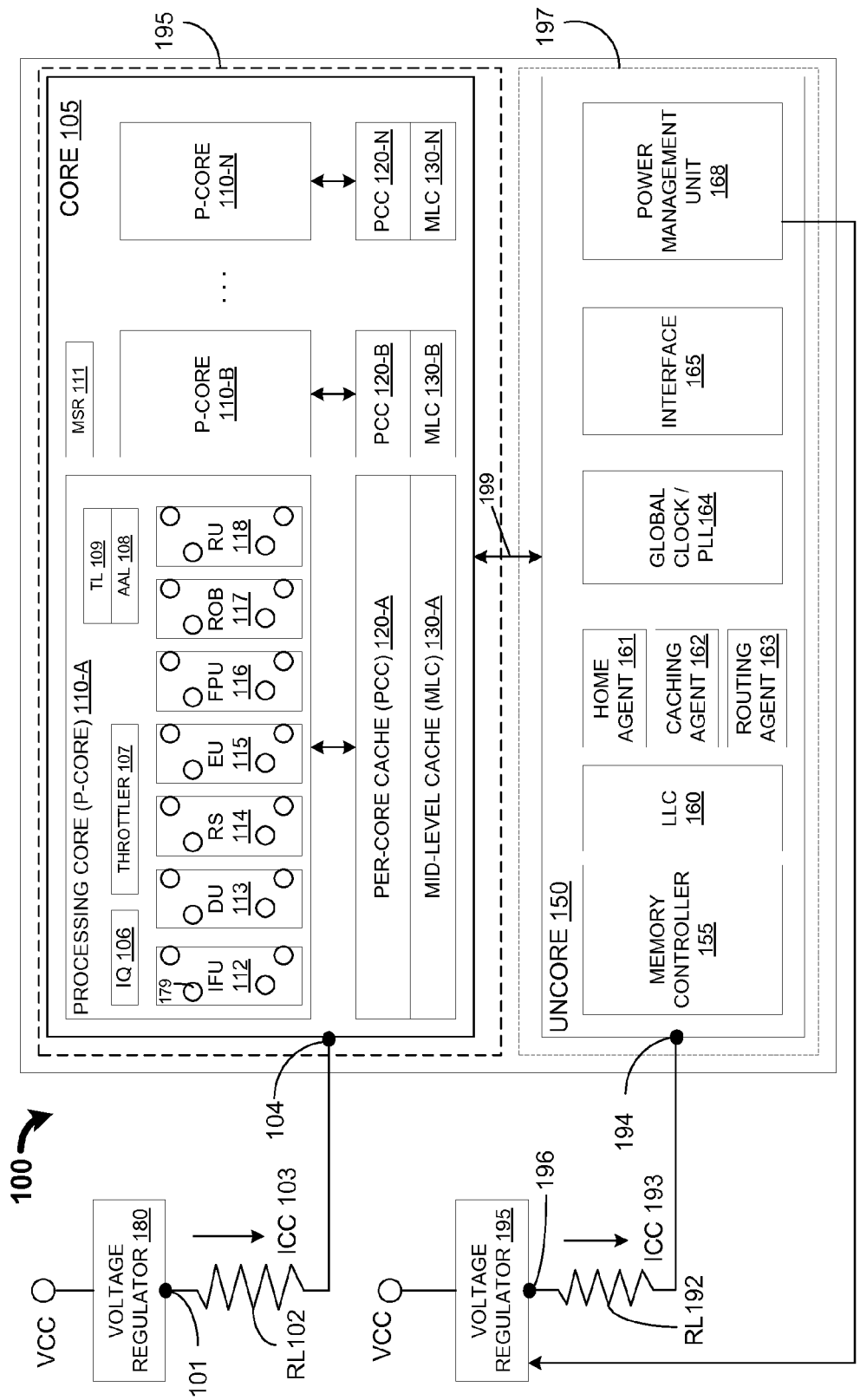
FIG. 1 illustrates a processor 100, which supports activity based power saving technique in the core area and the load-line IR drop based power saving technique in the uncore area in accordance with one embodiment.
Figure 5:
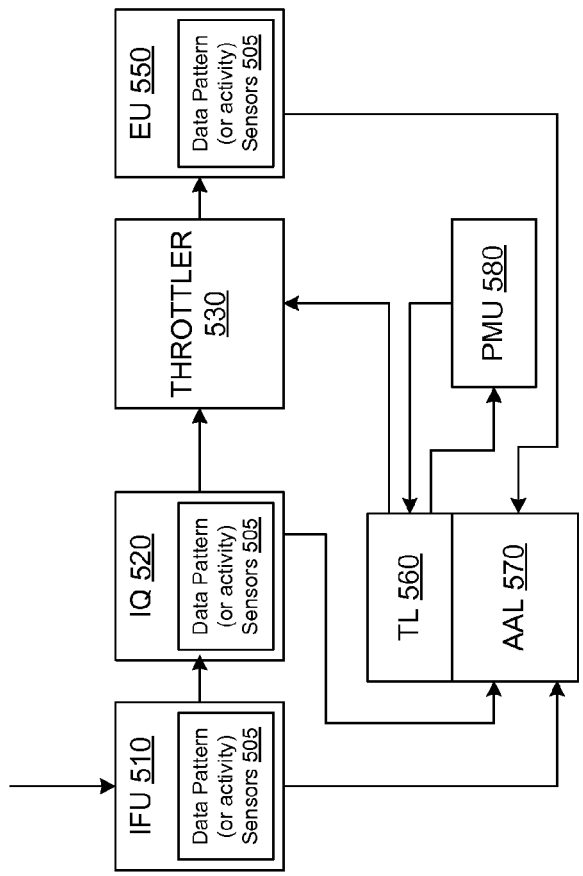
FIG. 5 illustrates a block diagram used to implement the activity based power saving technique used in the core area in accordance with one embodiment.

The following description describes embodiments of a technique to post weakly ordered transactions. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other similar signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

A processor forms an important portion of a computing system. The present day processors have core area comprising multiple processing cores and caches and a large uncore area. The power consumed by the processor has an impact on the overall power consumed by the computing system. The dynamic power (P) consumed by the processor may be given by $P=C_{dyn}*(V_{cc})^2*F$. In one embodiment, the power consumed by the core area of the processor may be controlled by controlling the Cdyn of the processor. In one embodiment, the Cdyn may be controlled such that the Cdyn is within an allowable Cdyn value irrespective of the application (or the code) being processed by the core area. In one embodiment, the power management technique may include measuring digital activity factor (DAF), monitoring architectural and data activity levels, and controlling power consumption by throttling the instructions based on the activity levels. In one embodiment, such an approach may provide a fine grained power management technique and an ability to create boost modes that control the code while the code is being processed as compared to boost modes, which may react to the code being processed. In one embodiment, the boost mode may refer to operating the core(s) or a processor at a higher frequency and higher voltage operating point to enable higher performance for lighter workloads.

In one embodiment, to control the power consumed by the core area, the processor may include, multiple activity sensors, an activity accumulation logic, a throttling logic, and a throttler. In one embodiment, the activity sensors may sense the activity occurring within the blocks (e.g., instruction fetch and decode unit, execution units, and such other units within the processing core) and provide the activity levels (architectural and data activity values) to the activity accumulation logic. In one embodiment, the activity sensors may be provided in the interfaces (or ports) of each block within the processing cores to enable the activity sensors to detect the architectural and data activity events. In one embodiment, the activity accumulation logic may generate an accumulated activity value in response to collecting the activity values from the activity sensors. In one embodiment, the activity accumulation logic may provide the accumulated activity level to the throttling logic. In one embodiment, the activity accumulation logic (AAL) may include weighing logic and aggregators and the weighing logic may assign a weight to each activity value provided by the activity sensors and the aggregators may accumulate (or sum up) the activity values to generate an accumulated activity value.

In one embodiment, the throttling logic may determine a Cdyn_actual in response to receiving the accumulated activity level. In one embodiment, the throttling logic may also calibrate the Cdyn_actual to a power score value. In one embodiment, the throttling logic may compare the power score with a target value (allowable Cdyn value) provided by a power control unit and generate a first signal if the power score is greater than the target value and a second signal if the power score is less than the target value. In one embodiment, the throttling logic may determine a first instruction dispersion rate (or value) based on the first signal and a second instruction dispersion value based on the second signal. In one embodiment, the throttling logic provides either the first or the second instruction dispersion value to the throttler.

In one embodiment, the throttler may either vary (increase the decrease) the throttling of instruction dispersion (or the rate at which the instructions are provided to the execution units) or maintain a previous throttling level based on the signal received from the throttling logic. In one embodiment, the throttler may increase the instruction throttling (i.e, fewer instructions may be provided to the execution units) in response to receiving the first instruction dispersion value and the throttler may decrease the instruction throttling (i.e., more number of instructions are allowed to reach the execution units) in response to receiving the second instruction dispersion value. Thus, the power consumption in the core area (or within the processing core) may be controlled by throttling the instruction dispersal based on the activity levels in the processing core. As a result of throttling the instructions based on the activity levels (or Cdyn_actual), throttling may be implemented in different time domains such as $3^{rd}$ droop (1 microsecond) and thermal design point (TDP) (1 millisecond), which allows long term (i.e., TDP) and short term (i.e., $3^{rd}$ droop) operations to control power consumption in the core area of the processor.

The size of the uncore area is ever increasing in the present day processors and so is the power consumed by the uncore area of the processor. Especially, in one embodiment, the idle power consumed by the uncore area (i.e., the power consumed by the uncore area while the core area is in a deep power saving states such as package C-state) may be reduced by varying the voltage (i.e, reference voltage VR) provided to the uncore area. In one embodiment, the output of a voltage regulator may be coupled to a supply pin of the uncore area through a load resistor RL. The voltage (VP) at the supply pin of the uncore area is less than the VR by an amount equaling the IR drop (=ICC*RL) i.e., VP=[VR−(ICC*RL)].

In one embodiment, a minimum value of voltage (VPmin) is to be provided to the uncore area if the uncore area has to be operated at a frequency value specified by the manufacturer of the part. In one embodiment, if VR=X and ICC=ICC_peak, the VP_peak=(X−ICC_peak*RL) volts. In one embodiment, the VP_peak should be at least equal to VPmin to avoid design failures and it may not be possible to reduce the VP_peak below VPmin value. In one embodiment, if the core area is in package C-state, the value of ICC may be equal to ICC_idle and the voltage (VP_idle) at the supply pin of the uncore area may equal=(X−ICC_idle*RL). As ICC_idle is less than the ICC_peak, the product of (ICC_idle*RL) will be less than the product of (ICC_peak*RL). As a result, the VP_idle will be greater than the VP_peak. In one embodiment, it may be sufficient to provide a minimum voltage (VPmin) at the pin of the uncore area while the core area is in package C-state.

But, in the absence of a technique to vary the reference voltage VR while a current (ICC_idle) is flowing through the load resistor RL, a voltage VP_idle, which is greater than the VPmin (or the VP_peak) is provided to the uncore area. Unnecessarily, an extra voltage value equal to (VP_idle−VP_peak) is provided to the uncore area even when ICC_idle is flowing through the load resistor RL. As a result, even while the uncore area is idle, an excess power proportional to square of the voltage equaling (VP_idle−VP_peak) is consumed by the uncore area. In one embodiment, while the core area is in deep package C-state, the reference voltage (VR) may be varied to reduce the voltage (VP_idle) provided at the supply pin of the uncore area. In one embodiment, reference voltage VR may be reduced to VP_reduced such that the VP_idle reduces to a value that is slightly higher than the VPmin (or VP_peak). In one embodiment, if (VP_idle−VP_peak) tends to zero, the idle power consumed by the uncore area may be minimum. In one embodiment, while the core area is in package C-state, the reference voltage (VR) may be varied to save or reduce the idle power consumed by the uncore area.

An embodiment of a processor 100, which may support power saving techniques to reduce the power consumed in the core and the uncore of the processor is illustrated in FIG. 1. In one embodiment, the processor 100 may comprise a core area 105 and an uncore area 150. In one embodiment, the core 105 and the uncore 150 may support a point-to-point bi-directional bus to enhance communication between the processing cores (p-cores) 110 and between the core area 105 and the uncore area 150. In one embodiment, the core area 105 may be provided with a power plane 195, which may include a voltage regulator 180 and the output 101 of the voltage regulator 180 may be coupled to a supply pin 104 through a load resistor RL 102.

In one embodiment, the core area 105 may comprise processing cores such as p-core 110-A to 110-N, per-core caches 120-A to 120-N associated with the p-cores 110-A to 110-N, respectively, and mid-level caches 130-A to 130-N associated with the p-cores 110-A to 110-N, respectively. In one embodiment, the p-cores 110 may include an instruction queue 106, a throttler 107, an activity accumulation logic AAL 108, a throttling logic TL 109, an instruction fetch unit IFU 112, a decode unit 113, a reservation station RS 114, an execution unit EU 115, a floating point execution unit FPU 116, a re-order buffer ROB 117, and a retirement unit RU 118. In one embodiment, each processor core 110-B to 110-N may include blocks that are similar to the blocks depicted in the processing core 110-A and the internal details of each of the processing cores 110-B to 110-N is not shown for brevity. In one embodiment, the per-core caches 120 may include memory technologies that may support higher access speeds, which may decrease the latency of instruction and data fetches, for example.

In one embodiment, the activity sensors 179 may sense the activity occurring within the blocks IFU 112, DU 113, RS 114, EU 115, FPU 116, ROB 117, and RU 118 and provide the activity levels (architectural and data activity values) to the activity accumulation logic. In one embodiment, the activity sensors 179 may be provided in the data paths of each block within the processing core 110-A to enable the activity sensors 179 to detect the architectural and data activity values. In one embodiment, to control the power consumed by the core area 105, the AAL 108 may collect the activity levels sensed by the multiple activity sensors 179 and generate an accumulated activity value. In one embodiment, the activity accumulation logic AAL 108 may provide the accumulated activity value to the throttling logic TL 109.

In one embodiment, the TL 109 may determine a Cdyn_actual in response to receiving the accumulated activity level. In one embodiment, the TL 109 may also calibrate the Cdyn_actual to a power score value. In one embodiment, the TL 109 may compare the power score with a target value (allowable Cdyn value) and generate a control signal, which may indicate whether to increase or decrease or maintain the throttling level of instructions or the instruction dispersal rate. In one embodiment, the throttler 107 may either vary (increase the decrease) or maintain the throttling of instructions or instruction dispersal rate based on the control signal received from the TL 109. In one embodiment, the throttler 107 may either increase the instruction throttling (i.e, fewer instructions may be provided to the execution units) or decrease the instruction throttling (i.e., more number of instructions are allowed to reach the execution units) in response to receiving the control signal.

Thus, the power consumption in the core area 105 (or within the processing cores 110) may be controlled by throttling the instructions based on the activity levels in (or Cdyn_actual of) the processing core 110. In one embodiment, the throttling of instructions may be performed based directly on the activity levels (or the Cdyn), the ability to control the power consumption may be quicker. Also, by limiting the Cdyn to a set value, the control of consumption of power in the core may be performed on a pro-active basis rather than being reactive to occurrence of excessive power consumption conditions. As a result of throttling the instructions based on the activity levels (or Cdyn_actual), throttling may be implemented in different time domains such as $3^{rd}$ droop (1 microsecond) and thermal design point (TDP) (1 millisecond), which may allow long term (i.e., TDP) and short term (i.e., $3^{rd}$ droop) operations to control power consumption in the core area 105 of the processor 100. In one embodiment, the Cdyn and its relationship to the type applications is illustrated in FIG. 3 below.

While the power consumption in the core area 105 may be controlled or managed using the activity level based techniques discussed above, the power consumption in the uncore area 150 may be managed using the power management techniques described below. In one embodiment, the uncore area 150 may include a memory controller 155, a last level cache LLC 160, a home agent HA 161, a caching agent CA 162, a routing agent RA 163, a global clock/PLL 164, an interface 165, and a power management unit 168. In one embodiment, the reference voltage VR may be varied to reduce, especially, the idle power consumed by the uncore area 150 while the core area 105 may be in deep package C-state (i.e., deep power saving state such as C3, C6/C7). In one embodiment, the uncore area 150 may be provided with a power plane 197 and the power plane 197 may include a voltage regulator 195 and the output 196 of the voltage regulator 195 may be coupled to the supply pin 194 of the uncore area 150 through a load resistor RL 192. In one embodiment, while the core area 105 is in package C-state, the activity or transactions on the interface path 199 may be zero.

While the core area 105 is active, a peak amount of current (ICC_peak) may flow through the RL 192, and the voltage (VP_peak) at the supply pin 194 of the uncore area 150 may be less than the reference voltage VR (at the output 196 of the voltage regulator 195) by an amount equaling the IR drop (=ICC_peak*RL) i.e., VP_peak=[VR−(ICC_peak*RL)]. For example, if VR=1 volt, RL192=1.4 milliohms, and ICC 193=ICC_peak=50 Amps, the IR drop may equal (ICC*RL)=(50 Amps*1.4 milliohms)=70 millivolts (my). As a result, the voltage (VP_peak) provided at the supply pin 194 may equal [1 volt−70 mv]=0.93 volts. In one embodiment, a minimum value of voltage VPmin (which is equal to VP-peak in this example) may be provided to the uncore area 150 if the uncore area 150 has to operated at a frequency value (or bin frequency) specified by the manufacturer of the part (i.e., the processor 100). In one embodiment, to avoid design failures, it may not be possible to reduce the value of reference voltage VR below a specified value (1 Volt in the above example).

In absence of a technique to vary the reference voltage VR and while the core area 105 is in package C-state, the current (ICC 193) flowing through RL 192 may equal ICC_idle and the voltage (VP_idle) at the supply pin 194 of the uncore area 150 may equal=[VR−(ICC_idle*RL)]. As ICC_idle is less than the ICC_peak, the product of (ICC_idle*RL) will be less than the product of (ICC_peak*RL). As a result, the VP_idle will be greater than the VP_peak. For example, ICC_idle may equal 20 Amps, and VP=[1 volt−(20 Amps*1.4 milliohms)]=[1 volt−28 mv]=0.972 volts, which is greater than the VP_peak (0.93 volts). As a result, an excess voltage equaling (VP_idle−VP_peak)=(0.972−0.93=0.042 volts) is unnecessarily provided to the uncore area 150. As a result, the power consumed by the uncore area in the idle state (i.e., power consumed_idle) may be normal_power_consumed_idle, which may be equal to (=dynamic power+leakage power= $\{[Cdyn*(VP\_idle)^2*f]+[function of (VP\_idle)^4]\}=\{[5 nF*(0.972)^2*2.53 GhZ]+[5 watts]\}=16.95$ watts.

In one embodiment, by opportunistically varying the reference voltage VR based on whether the core area 105 is in deep power saving state or a package C-state may provide opportunities to save power consumption during the idle state of the core area 105. In one embodiment, the voltage provided to the core area 105 may be substantially cutoff using power gate transistors (PGT) or embedded power gate (EPG). In one embodiment, while the core area 105 is operating in the deep power saving state the activity injected by the core area 105 into the uncore area 150 may be substantially low. In one embodiment, it may be sufficient to provide a minimum voltage (VPmin=0.93 volts) at the supply pin 194 of the uncore area 150 while the core area 105 is in package C-state. To reduce the VP_idle to VP_reduced, a value, which may be closer to VPmin, the power management unit 168 may detect a package C-state condition of the core area 105 and may generate a voltage value (VID_R) in a digital format. In one embodiment, the VID_R value may be provided to the voltage regulator 195. In one embodiment, the voltage regulator 195 may generate a reference voltage VR, which may be less than VR_peak (=1 volt) in response to receiving the VID_R value from the power management unit 168.

In one embodiment, the VP_idle (or VP_normal) provided at the supply pin 194 may be reduced due to a decrease in the value of VR from VR_peak value (or VR_normal to a VR_reduced value. In one embodiment, reducing the reference voltage VR from VR_normal value to VR_reduced value may cause a reduction in the VP from VP_idle to VP_reduced. In one embodiment, the power consumed by the uncore area 150 may reduce as well in response to reducing the value of VP from VP_idle to VP_reduced. For example, the voltage regulator 195, in response to receiving the VID, may reduce the VR from VR_normal (1 volt) to VR_reduced (0.96 volts), as a result, VP may reduce from VP_idle to VP_reduced [=0.96−(20 Amps*1.4 milliohms)=(0.96−0.028)=0.932 volts]. In one embodiment, the power consumed_idle may be reduced to Reduced_power_consumed_idle (i.e., P_idle_reduced= dynamic power+leakage power= $\{[Cdyn*(VP\_reduced)^2*f]+[function of (VP\_reduced)^4]\}=\{$for example, $[5 nF*(0.932)^2*2.53 GhZ]+[4 watts]\}=14.998$ watts. As a result, the power saved=[normal_power_consumed_idle)−(Reduced_power_consumed_idle)=(16.95−14.998)=1.96 watts). Therefore, in one embodiment, by opportunistically varying the reference voltage VR, the power consumed by the uncore area 150 may be reduced from normal_power_consumed_idle to reduced_power_consumed_idle in response to the core area 105 entering a package C-state.

In one embodiment, the power management unit 168 may detect an onset of an exit event from the package C-state to a normal mode of the core area 105. In response to the detection of the onset of the exit event, the power management unit 168 may generate a VID_N value corresponding to a normal reference voltage and the VID_N value may be provided to the voltage regulator 195. In one embodiment, in response to receiving the VID_N value, the voltage regulator 195 may increase the VR value from VR_reduced to VR_normal (or VR_peak) value. As a result, the voltage provided at the supply pin 104 of the uncore area 150 may be maintained at or slightly above the VPmin value. In one embodiment, the changes in the reference voltage from VR_reduced to VR_normal and the changes in the VP from VP_reduced to VP_idle (or VP_normal) may happen well within the exit latency before the uncore 150 may see any activity induced by the core area 105. Thus, the minimum voltage VPmin levels may be maintained without affecting the performance of the processor 100.

An embodiment of the core area 105 and determining a corresponding dynamic capacitance Cdyn is illustrated in FIG. 2. In one embodiment, the core 210 may be represented by a total capacitance $C_{Total}$ 220 and the dynamic capacitance Cdyn 240 may be equal to ($C_{Total}$ 220*activity factor). In one embodiment, the Cdyn 240 may vary based on the application (or the code) that is being processed. For example, some applications such as power virus and HPC may exhibit higher activity levels as compared to some other applications such as mainstream applications. Thus, Cdyn 240 may be a fraction of the $C_{Total}$ 220.

A graph 300 of Cdyn Vs workload of various application types is depicted in FIG. 3. The graph 300 includes a Y-axis 310 and an X-axis 320, which may, respectively, represent the normalized Cdyn and an approximate number of applications available based on the workload of various application types. In one embodiment, the graph 300 includes various applications such as idle applications 330, which may be large in number followed by the mainstream applications 340, the high performance computing HPC applications 350, and the power virus applications 360. In one embodiment, the processor 100 may be optimized for mainstream applications 340 by setting the throttle to a lower application ratio of 0.55 indicated by a line 345. However, the throttle may be set to a higher application ratio of 0.633 indicated by line 355 if the processor 100 is to be optimized for HPC applications. In one embodiment, the application ratio may refer to a ratio of the power consumed for a given application as compared to the power consumed by the highest power consumption application such as the power virus (PV). In other embodiment, the application ratio may also refer to a ratio of a real application and power virus application.

In one embodiment, if the power virus application 360 is to processed, the target value (allowable Cdyn) may be set to a value such that the comparison of Cdyn_actual to the target value may set a more constrictive (i.e., higher) throttling value to allow fewer instructions to reach the execution units in a given time period as compared to that while processing HPC applications 350 or mainstream applications 340. In one embodiment, the power management technique discussed above may allow the power virus application to be processed by the processor 100, however, the throttling of instructions may set more constrictive (i.e., higher) throttling value to allow a fewer instructions to be processed. Such an approach avoids a condition in which a high power application (e.g., power virus) limits the frequency at which all the applications may be processed. Further, by throttling high power applications, the current drawn while processing the high power application is reduced allowing a lowest operating voltage (and therefore the frequency) to be set by the throttle level. Also, such an approach may allow a user to monitor and configure the processor to be optimized for HPC code or mainstream code in a real time by configuring machine specific registers MSR 111.

Figure 4:
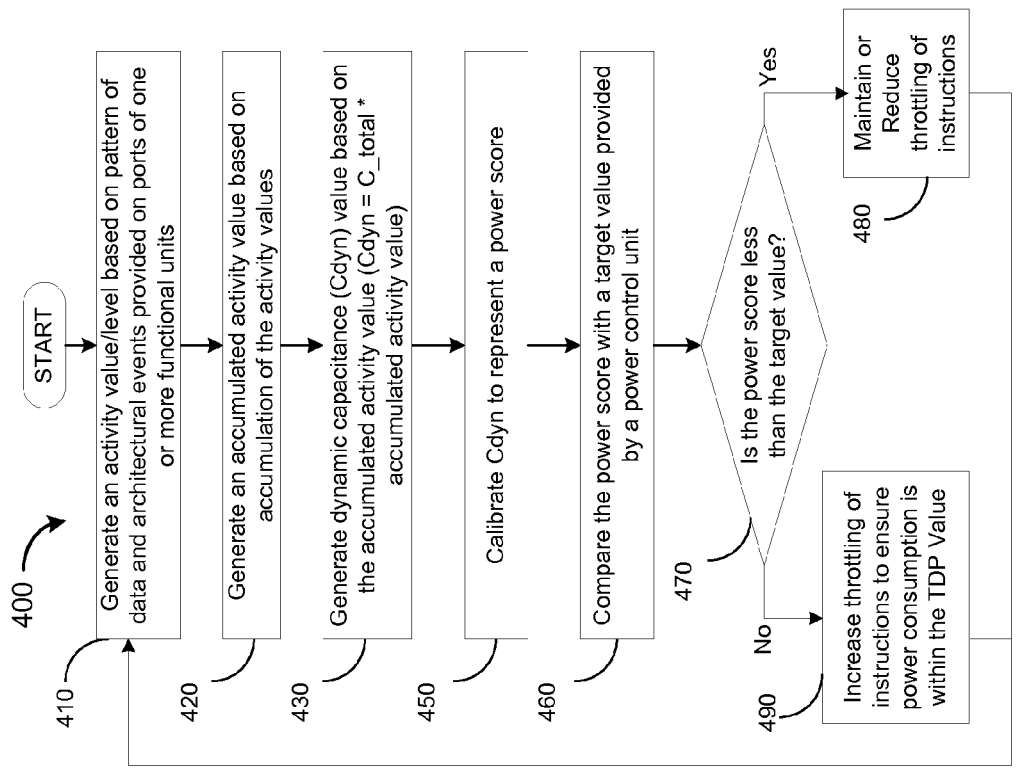
FIG. 4 illustrates a flow-chart, which depicts an activity based power saving technique used in the core area in accordance with one embodiment.

A flow-chart depicting the operation of the core area 105 while performing power management techniques described above is illustrated in FIG. 4. In block 410, the activity sensors 179 or the data pattern sensors 505 may generate an activity value/level based on pattern of data and architectural events provided on ports or data paths of one or more functional units such as IFU 510, IQ 520, and the EU 550. In one embodiment, the activity values may be provided to an activity accumulation logic AAL 570.

In block 420, the activity accumulation logic AAL 570 may receive the activity values from the data pattern (or activity) sensors and generate an accumulated activity value. In one embodiment as shown in FIG. 6, the AAL 570 may include a weighing logic 610, summing units 630, 640, 650, and 660, and an accumulator 670. In one embodiment, the weighing logic 610 may include weighing elements 610-A to 610-H and each of the weighing elements 610-A to 610-D may receive data inputs 605-A to 605-D from functional units such as IFU 510, IQ 520, and EU 550 and the data inputs 605-A to 605-D so received may indicate the work being done. In one embodiment, the data inputs 605-A to 605-D received from the functional units 510, 520, and 550 may be updated every cycle and the width of such data inputs 605-A to 605-D may be less than 128 bits. In one embodiment, the data inputs 605-A to 605-D received from the functional units may represent an operational power and may, for example, include floating point unit digital activity factor (FPUDAF), instruction fetch and resteer digital activity factor (IFRDAF), and such other similar input values. In one embodiment, the data inputs 605-A to 605-D may be provided a weight value based on a pre-determined logic before providing the weighted inputs to the summing unit 630. In one embodiment, the weighing elements 610-E to 610-H may receive data inputs 605-E to 605-H from register files indicating data being consumed. In one embodiment, the data inputs 605-E to 605-H may be updated every 128 cycles and the weighing elements 610-E to 610-H may provide weight values to the data inputs 605-E to 605-H before providing the weighted inputs to the summing unit 640. In one embodiment, the summing units 650 and 660 and the accumulator 670 may together generate the accumulated activity value of an appropriate width (for example, 44 bits wide). In one embodiment, the summing unit 650 may sum the data input sum from 640 with the activity input sum from 650. In one embodiment, the accumulator latch 670 may feedback the value through the accumulator summer 660 and may generate the accumulated activity value of an appropriate width.

In block 430, the throttling logic TL 560 may receive the accumulated activity value, provided by the AAL 560, and generate a dynamic capacitance (Cdyn) value. In one embodiment, the throttling logic TL 560 may determine the Cdyn_actual based on the $C_{Total}$ and the accumulated activity value. In block 450, the throttling logic TL 560 may calibrate the Cdyn_actual to represent a power score value.

In block 460, the throttling logic TL 560 may compare the power score, generated based on the Cdyn_actual value, with a target value provided by the power management unit PMU 580. In one embodiment, the target value provided by the PMU 580 may represent an allowable Cdyn value calibrated as power score. In one embodiment, the user may optimize the processor for HPC applications 350 and the allowable Cdyn value may be equal to an application ratio of 0.633, which may be calibrated to a power score value. In one embodiment, the activity levels, the accumulated activity value, the Cdyn_actual, and the power score may represent a higher value if the core area 105 is processing a power virus application 360.

In block 470, the TL 560 may compare the power score corresponding to the allowable Cdyn and the power score corresponding to the Cdyn_actual and control passes to block 480 if the power score is less than the target value and to block 490 otherwise. In one embodiment, the TL 560 may generate a first signal if the power score is less than the target value and may generate a second signal if the power score is greater than the target value. In the above example, the TL 560 may compare the power score (i.e., calibrated to the Cdyn_actual) corresponding to the power virus PV application 360 with the target value, which may be set for an allowable Cdyn corresponding to the HPC application 350 and the TL 560 may generate a second signal as the power score may be greater than the target value.

In block 480, the throttler 530 may maintain or reduce the throttling of instructions in response to receiving the first signal. In one embodiment, the first signal may indicate that more instructions may be processed without exceeding the Cdyn envelope or power score envelope and the throttler 530 may decrease throttling (or increase the instruction throughput). On the other hand, if the first signal indicates that the instruction throughput is less than the target value but very close to the target value, the throttler 530 may maintain the instruction throughput without altering the throttling level.

In block 490, the throttler 530 may increase the throttling of instructions to ensure the power consumption is within the TDP envelope. In one embodiment, if the power score is greater than the target value, the instruction throughput is reduced by increasing the throttling level thus allowing fewer instructions to reach the execution units. In the above example, the throttler 530 may quickly increase the throttling level to decrease the instruction throughput. As a result of throttling the instructions based on the activity levels (or Cdyn_actual), throttling may be implemented in different time domains such as $3^{rd}$ droop (1 microsecond) and thermal design point (TDP) (1 millisecond), which may allow long term (i.e., TDP) and short term (i.e., $3^{rd}$ droop) operations to control power consumption in the core area 105 of the processor 100.

A graph 700 depicting a plot of instantaneous activity with and without throttle is illustrated in FIG. 7. The graph 700 includes a Y-axis 710 representing application ratio and an X-axis 740 representing time (in microseconds). In one embodiment, if a burst activity (instantaneous activity), which may occur for a duration lesser than a small duration T1 may be allowed with any throttling and such a burst activity 750, which may be allowed without being throttled is depicted in graph 700. However, in one embodiment, if a sustained activity occurs, which may occur beyond the time duration T1, the power management technique described above may begin to throttle the instructions. The graph 700 depicts such a sustained activity 760, which may be throttled as shown by the throttled activity 770. It may be observed that the sustained activity 760, if left un-throttled may occur for a time duration T2, however, in one embodiment, the sustained activity 760 may be throttled using the power management technique described above. As a result of throttling, the instruction dispersal or instruction throughput may be varied and the sustained activity 760 may be spread out over a longer duration of time T3 and such a spread out activity may be referred to as throttled activity 770.

An graph 800 depicting a plot of average activity demanded and an average activity granted over a time period is illustrated in FIG. 8. The graph 800 includes a Y-axis 810 representing application ratio and an X-axis 840 representing time (in microseconds). In one embodiment, the average activity demanded may be represented by a plot 830 and the average activity granted may be represented by a plot 820. In one embodiment, the average activity demanded over a time period T5 may have a peak application ratio of 1. However, in one embodiment, the peak application ratio may not be granted by the power management technique discussed above. Instead, a lower application ratio (of 0.8, for example) may be allowed and the time period over which such a throttled average activity granted 820 may occur is T6, which may be greater than T5.

Figure 9:
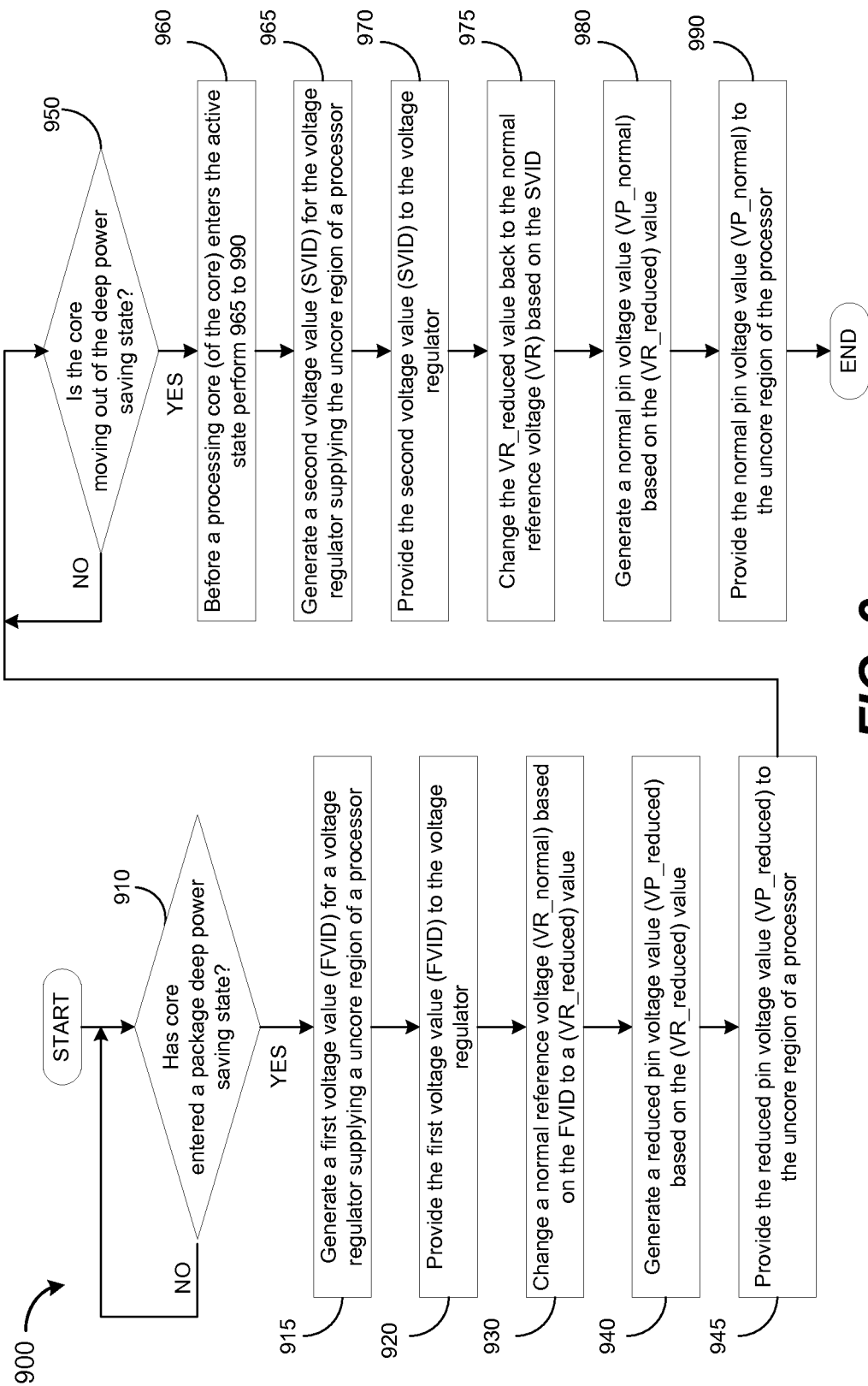
FIG. 9 is a flow-chart, which illustrates a load-line IR drop based power saving technique used in the uncore area in accordance with one embodiment.

An embodiment of an operation of the power management path including the power management unit PMU 168 and the voltage regulator 195 to reduce the idle power consumed by the uncore area 150 while the core area 105 is in package C-state is illustrated in FIG. 9.

In block 910, the PMU 168 may check if the core area 105 has entered a package C-state and control passes to block 915 if the core area 105 has entered a package C-state and the PMU 168 may wait for the core area 105 to enter a deep power saving state (or package C-state).

In block 915, the PMU 168 may generate a first voltage value (FVID or VID_R discussed above) to be provided to a voltage regulator 195 supplying the uncore area 150 of the processor 100. In one embodiment, the FVID or VID_R may represent a digital value (9 bit value) based on which the voltage regulator 195 may generate a reference voltage VR (=VR_reduced). In block 920, the PMU 168 may provide the FVID to the voltage regulator 195.

In block 930, the voltage regulator 195 may change the VR from a normal reference voltage (VR_normal) to a reduced reference voltage (VR_reduced) based on the FVID value. In one embodiment, the VR may be reduced from a VR_normal of 1 volt to a VR_reduced value of 0.96 volts.

In block 940, as a result of the change in VR from VR_normal to VR_reduced, the voltage VP provided at the supply pin 194 may change to VP_reduced. In one embodiment, the VP may be reduced from VP_idle of 0.972 volts to 0.932 volts as discussed above in response to a change in VR from 1 volt to 0.96 volts.

In block 945, as a result of the change in VP from VP_idle to VP_reduced (i.e., from 0.972 volts to 0.932 volts), the supply pin 194 of the uncore area 150 may be provided with a pin voltage of VP_reduced (=0.932 volts). As a result of lowering the voltage value provided to the uncore area 150, the idle power consumed by the uncore area 150 may decrease as well (for example, from 16.95 watts to 14.988 watts, causing a power saving of 1.96 watts as described above).

In block 950, the PMU 168 may check for a package C-state exit event of the core and if the PMU 168 detects a package C-state exit event, control passes to block 960. In one embodiment, the operation performed by the PMU 168 in block 950 may be performed in parallel and independent of the operation in the blocks 915 to 945.

In block 960, the PMU 168 may perform blocks 965 to 990 before the core area 105 or any processing core 110 within the core area 105 exits from the package C-state to enter into an active state. In block 965, the PMU 168 may generate a second voltage value (SVID or VID_N discussed above) to be provided to the voltage regulator 195 supplying the uncore area 150 of the processor 100. In one embodiment, the SVID or VID_N may represent a digital value (9 bit value) based on which the voltage regulator 195 may generate a reference voltage VR (=VR_normal). In block 970, the PMU 168 may provide the SVID (or VID_N) to the voltage regulator 195.

In block 975, the voltage regulator 195 may change the VR from VR_reduced to the normal reference voltage (VR_normal) based on the SVID value. In one embodiment, the VR may be increased from a VR_reduced value of 0.96 volts to a VR_normal value of 1 volt.

In block 980, as a result of the change in VR from VR_reduced to VR_normal, the voltage VP provided at the supply pin 194 may change to VP_idle. In one embodiment, the VP may be increased from the VP_reduced (0.932) volts to 0.972 volts as discussed above in response to a change in VR from 0.96 volts to 1 volt.

In block 990, the current flowing through the load resistor RL 192 may change from ICC_idle (20 Amps) to ICC_peak (=50 Amps), as a result of the change in VP from VP_reduced to VP_idle (i.e., from 0.932 to 0.972 volts) and the change in current ICC_idle to ICC_peak, the voltage VP (=0.93 volts) may be provided at the supply pin 194 of the uncore area 150.

An embodiment of an operation of the voltage regulator 195 under normal and idle conditions with and without using the power management technique described above is illustrated in FIGS. 10(A), 10(B), and 10(C). In FIG. 10(A), while the uncore 150 is operating at peak, the reference voltage VR may be equal to VR_normal, ICC 193 may be equal to ICC_peak; and the pin voltage VP may be equal to VP_idle. In one embodiment, the VP_idle may equal {[VR_normal−(ICC_peak*RL 192)]}.

For example, if VR_normal=1 volt, ICC_peak=50 Amps, and RL192=1.4 mohms, VP_idle=1−(50*1.4)=0.93V. If the processor 100 has to operate at frequency F (=2.53 GhZ, for example) specified for the part, a minimum value of voltage (=0.93 volts) is to be provided as VP_idle.

However, when the core area 105 is in package C-state, as shown in FIG. 10(B), the current ICC193 flowing through the load resistor RL 192 may change to ICC_idle (=20 A, for example), then VP_idle is equal to [VR_normal−(ICC_idle*RL 192)]i.e., VP_idle=1−(20*1.4)=0.972V. But, VP_idle of 0.93V is sufficient to operate the processor 100 at the frequency F specified for the part and an excess voltage of (VP_idle−minimum value of voltage=0.972−0.93=0.042V) is provided to the uncore area 150. The excess voltage may result in excess consumption of more power than required. As a result, the power consumption, P_normal=dynamic power+Leakage power, P_normal=Cdyn*V2*f+f(V4), =5 nf*(0.972*0.972)*2.53 Ghz+5 Watts, =(11.95+5)=16.95 watts.

To reduce the VP, VR is to be reduced from VR_normal to VR_reduced as shown in FIG. 10(C). To reduce VR_uncore, the PMU 168 may generate a FVID (as described in block 915) and provide the FVID (as described in block 920) to voltage regulator 195. In response to receiving FVID, the voltage regulator 195 may reduce VR to VR_reduced (=0.96V, for example). In response to a change in the VR from VR_normal to VR_reduced, VP_idle becomes VP_reduced (=0.96−(20*1.4)=0.96−0.028=0.932V). As a result, the power consumption P_reduced=Cdyn*V2*f+f(V4)=5 nf*(0.932*0.932)*2.53 Ghz+4 Watts=(10.988+4)=14.988 watts. Therefore, the Power saved=P_normal−P_reduced=16.95−14.988=1.96 watts.

A graph 1100, 1140, and 1160 illustrate the effect on the uncore area 150 in response to the core area 105 entering a deep power saving state (package C-state) is depicted in FIGS. 11(a), 11(b), and 11(c), respectively. In one embodiment, the graph of FIG. 11(a) includes a X-axis 1101 representing time and Y-axis 1102 representing current (ICC 193). In one embodiment, ICC193 may equal ICC_peak 1106 (=50 Amps, for example) before the core area 105 enters a package C-state indicated by a region prior to an entry point 1105. At entry point 1105, the core area 105 may begin to enter the package C-state, and in response to the entry event at the point 1105, the current ICC 193 may change from ICC_peak to ICC_idle (=20 Amps) at a point 1108 and the ICC_idle level may be indicated by the ICC_idle 1107. In one embodiment, at the exit point 1109, the ICC 193 may change from ICC_idle 1107 to ICC_peak 1106 and the exit event of the core area 105 may be complete at time point 1110. In one embodiment, the time difference between the points 1108 and 1105 may represent the entry latency and the time difference between the points 1109 and 1110 may represent the exit latency.

FIG. 11(b) illustrates a variation in the reference voltage VR and the pin voltage VP in response to a change in the current from ICC_peak 1106 to ICC_idle 1107 and from the ICC_idle 1107 back to ICC_peak 1106. In one embodiment, the graph of FIG. 11(b) includes a X-axis 1111 representing time and Y-axis 1112 representing voltage (VR and VP). Before the entry point 1105, the voltage reference VR and VP may respectively equal VR_normal 1113 and VP_idle or VP_normal 1115. After the exit point 1109, the voltage reference VR and VP may respectively equal VR_normal 1113 and VP_idle 1115. In response to the occurrence of the entry event at point 1105, the voltage regulator 195 may receive a FVID (or VID_R) and the reference voltage VR may change from VR_normal 1113 (=1 volt, for example) to VR_reduced 1114 (=0.96 volts, for example). In response to a change in the reference voltage VR from VR_normal 1113 to VR_reduced 1114, the pins voltage VP at the supply pin 194 may decrease from VP_idle 1115 (=0.972 volts, for example) to VP_reduced 1116 (=0.932 volts, for example). In one embodiment, the reference voltage VR and the pin voltage VP may, respectively, remain at VR_reduced 1114 and VP_reduced 1116 between the time points 1108 and 1109, which may represent the time duration in which the core area 105 remains in the deep power saving state.

FIG. 11(c) illustrates a variation in the power consumed in response to a change in the pin voltage VP from VP_idle 1115 to VP_reduced 1116. In one embodiment, the graph of FIG. 11(c) includes an X-axis 1121 representing time and Y-axis 1122 representing power consumed. Before the entry point 1105, the power Consumed_idle may equal Normal power consumed 1123 (=16.95 watts, for example). After the exit point 1109, the power Consumed_idle may again reach the prior level Normal power consumed 1123. In one embodiment, in response to the core area 105 entering the package C-state, the power consumed by the uncore area 150 may decrease to Reduced power consumed 1124 (=14.988 watts, for example). In one embodiment, as the pin voltage VP decreases from VP_idle 1115 to VP_reduced 1116, the power consumed by the uncore area 150 may decrease as well as the power consumed by the uncore area 150 may be proportionate to the square of the pin voltage provided at the supply pin 164. In one embodiment, the amount of power saved may equal (Power Consumed_idle−Reduced power consumed)=(16.95−14.988)=1.95 volts.

Figure 12:
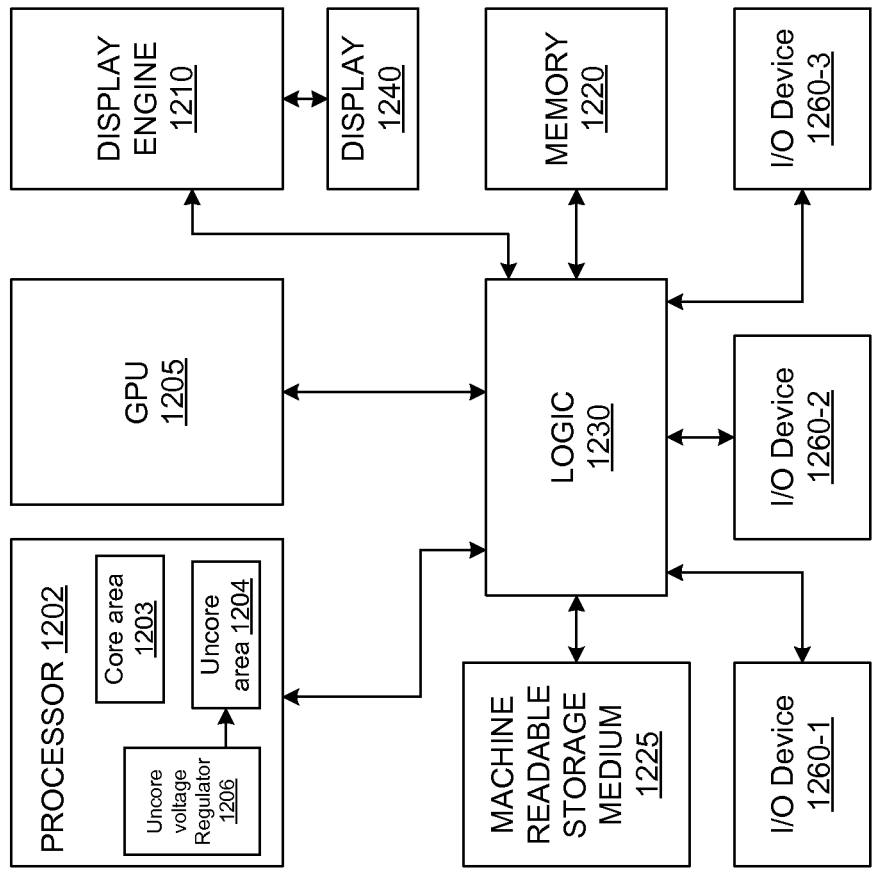
FIG. 12 illustrates a block diagram of a computer system in accordance with an embodiment of the present invention.

Referring to FIG. 12, a computer system 1200 may include a general purpose processor 1202 including a single instruction multiple data (SIMD) processor and a graphics processor unit (GPU) 1205. The processor 1202, in one embodiment, may perform enhancement operations in addition to performing various other tasks or store a sequence of instructions, to provide enhancement operations in a machine readable storage medium 1225. However, the sequence of instructions may also be stored in the memory 1220 or in any other suitable storage medium.

While a separate graphics processor unit 1205 is depicted in FIG. 12, in some embodiments, the graphics processor unit 1205 may be used to perform enhancement operations, as another example. The processor 1202 that operates the computer system 1200 may be one or more processor cores coupled to logic 1230. The logic 1230 may be coupled to one or more I/O devices 1260, which may provide interface the computer system 1200. The logic 1230, for example, could be chipset logic in one embodiment. The logic 1230 is coupled to the memory 1220, which can be any kind of storage, including optical, magnetic, or semiconductor storage. The graphics processor unit 1205 is coupled through a frame buffer to a display 1240.

In one embodiment, the processor 1202 may include a core area 1203 and an uncore area 1204. In one embodiment, the power consumed by the core area 1203 of the processor 1202 may be controlled by controlling the Cdyn of the processor 1202. In one embodiment, the Cdyn may be controlled such that the Cdyn is within an allowable Cdyn value irrespective of the application (or the code) being processed by the core area 1203. In one embodiment, the power management technique may include measuring digital activity factor (DAF), monitoring architectural and data activity levels, and controlling power consumption by throttling the instructions based on the activity levels as described above. As a result of throttling the instructions based on the activity levels (or Cdyn_actual), throttling may be implemented in different time domains such as $3^{rd}$ droop (1 microsecond) and thermal design point (TDP) (1 millisecond), which allows long term (i.e., TDP) and short term (i.e., $3^{rd}$ droop) operations to control power consumption in the core area of the processor. In one embodiment, such an approach may provide a fine grained power management technique and an ability to create boost modes that control the code while the code is being processed as compared to boost modes, which may react to the code being processed.

In one embodiment, the idle power consumed by the uncore area 1204 (i.e., the power consumed by the uncore area while the core area is in a deep power saving states such as package C-state) may be reduced by varying the voltage (i.e, reference voltage VR) provided to the uncore area 1204. In one embodiment, the output of a voltage regulator 1206 may be coupled to a supply pin of the uncore area 1204 through a load resistor. The reference voltage VR and thus the pin voltage (VP) at the supply pin of the uncore area 1204 may be decreased, while the core area is in deep package C-state. In one embodiment, reference voltage VR may be reduced such that the VP_idle reduces to a value that is slightly higher than the VPmin (or VP_peak). As a result, the reference voltage (VR) may be varied to save or reduce the idle power consumed by the uncore area 1204.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A processor comprising:
a core area including a plurality of cores and coupled to a first voltage regulator, wherein the first voltage is to provide a first regulated voltage (VR) to the core area via a first supply pin of the core area coupled to a first load resistor; and
an uncore area having a power management unit and coupled to a second voltage regulator, wherein the second voltage regulator is to provide a second VR to the uncore area independently of the first VR, via a second supply pin of the uncore area coupled to a second load resistor, wherein the power management unit is to detect an event based on which the core area is to enter a deep power saving state in which the first VR is to be substantially cut off and in response provide a first voltage value to the second voltage regulator, the second voltage regulator to decrease the second VR from a first reference voltage value to a second reference voltage value based on the first voltage value, the decrease to cause a reduction in a pin voltage value provided at the second supply pin of the uncore area, wherein the reduction in the pin voltage value is to decrease power consumption of the uncore area, wherein the pin voltage value is to be decreased to a level sufficient to maintain a minimum pin voltage value to operate the processor at a specified frequency value.

2. The processor of claim 1, wherein the uncore area is to consume a reduced amount of power until the core area is in the deep power saving state.

3. The processor of claim 1, wherein the power control unit is to generate a second voltage value in response to detection of an exit event by which the core area exits the deep power saving state and provide the second voltage value to the second voltage regulator.

4. The processor of claim 3, wherein the second voltage regulator is to increase the second VR from the second reference voltage value to the first reference voltage value in response to receipt of the second voltage value.

5. The processor of claim 4, wherein the increase in the second reference voltage to the first reference voltage value is to provide at least the minimum pin voltage value at the second supply pin of the uncore area to allow the processor to be operated at the specified frequency value.

6. A system comprising:
a processor having an uncore area including a power management unit and a second voltage regulator, wherein the second voltage regulator is to provide a second regulated voltage (VR) to the uncore area, via a second supply pin of the uncore area coupled to a second load resistor, and a core area including a plurality of functional blocks, a plurality of sensors, an activity accumulation logic, a throttling logic, a throttler and a first voltage regulator, wherein the first voltage regulator is to provide a first VR to the core area independently of the second VR, via a first supply pin of the core area coupled to a first load resistor, wherein the power management unit is to detect an event based on which the core area is to enter a deep power saving state in which the first VR is to be substantially cut off and in response provide a first voltage value to the second voltage regulator to cause the second voltage regulator to decrease the second VR from a normal reference voltage value to a reduced reference voltage value based on the first voltage value to cause a reduction in a pin voltage value provided at the second supply pin of the uncore area, wherein the reduction in the pin voltage value is to decrease a power consumed by the uncore area, the pin voltage value to be decreased to a level sufficient to maintain a minimum pin voltage value to operate the processor at a specified frequency value; and
a dynamic random access memory (DRAM) coupled to the processor.

7. The system of claim 6, wherein the plurality of sensors are provided in one or more ports of the plurality of functional blocks to sense data activity and architectural activity of the plurality of functional units.

8. The system of claim 6, wherein the plurality of sensors are to collect a plurality of activity levels from the plurality of functional blocks and provide the plurality of activity levels to the activity accumulation logic, wherein the activity accumulation logic is to generate an accumulated activity value and provide the accumulated activity level to the throttling logic, the throttling logic to determine an actual dynamic capacitance value based on data pattern observation and the accumulated activity value and generate a signal indicative of a throttling level to be adapted based on comparison of the accumulated activity value with a target value, and the throttler to throttle instructions provided to the plurality of functional blocks based on the throttling level.

9. The system of claim 8, wherein the throttling logic is to calibrate the actual dynamic capacitance value to a power score value, and compare the power score value with the target value provided by the power management unit, wherein the target value is determined based on an allowable dynamic capacitance value.

10. The system of claim 9, wherein the throttling logic is to generate the signal, which is indicative of increasing the throttling level if the power score value is greater than the target value.

11. The system of claim 10, wherein the throttler is to decrease instruction throughput in response to receipt of the signal that is indicative of increasing the throttling level, wherein the decrease in the instruction throughput is to maintain the actual dynamic capacitance below the allowable dynamic capacitance.

* * * * *